United States Patent
Rousseau

(10) Patent No.: US 8,494,015 B2
(45) Date of Patent: Jul. 23, 2013

(54) LASER EMITTING PULSES OF VARIABLE PERIOD AND STABILIZED ENERGY

(75) Inventor: Pascal Rousseau, Viroflay (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/518,881

(22) PCT Filed: Dec. 15, 2010

(86) PCT No.: PCT/EP2010/069701
§ 371 (c)(1),
(2), (4) Date: Jun. 23, 2012

(87) PCT Pub. No.: WO2011/076624
PCT Pub. Date: Jun. 30, 2011

(65) Prior Publication Data
US 2012/0263199 A1    Oct. 18, 2012

(30) Foreign Application Priority Data
Dec. 23, 2009 (FR) ..................................... 09 06293

(51) Int. Cl.
*H01S 3/11* (2006.01)
*H01S 3/115* (2006.01)
*H01S 3/117* (2006.01)
*H01S 3/10* (2006.01)

(52) U.S. Cl.
USPC .................. 372/10; 372/12; 372/13; 372/28

(58) Field of Classification Search
USPC ........................ 372/10, 11, 12, 13, 28
See application file for complete search history.

(56) References Cited

U.S. PATENT DOCUMENTS

| 5,982,790 A * | 11/1999 | Grossman et al. ............... 372/25 |
| 2006/0268950 A1 * | 11/2006 | Kane ............................... 372/30 |
| 2008/0170597 A1 | 7/2008 | Van Der Veer | |

FOREIGN PATENT DOCUMENTS

| WO | 2008/086989 A1 | 7/2008 |
| WO | 2009/089619 A1 | 7/2009 |

* cited by examiner

*Primary Examiner* — Armando Rodriguez
(74) *Attorney, Agent, or Firm* — Baker & Hostetler, LLP

(57) ABSTRACT

A laser device suitable for emitting pulses with a variable period and with stabilized energy includes: a resonant cavity including an amplifying medium presenting a stabilized gain G and suitable for emitting laser pulses at a wavelength λ, and a Q-switch, and a source of continuous pumping of the amplifying medium. It furthermore includes an injector positioned outside the resonant cavity, suitable for emitting a beam of wavelength λ into the amplifying material for the duration of the pumping, and which includes means for adjusting the power of this beam in order to reduce the gain of the amplifying medium to G/k, where k is a real number greater than 1.

5 Claims, 2 Drawing Sheets

LASER EMITTING PULSES OF VARIABLE PERIOD AND STABILIZED ENERGY

CROSS-REFERENCE TO RELATED APPLICATIONS

This application is a National Stage of International patent application PCT/EP2010/069701, filed on Dec. 15, 2010, which claims priority to foreign French patent application No. FR 0906293, filed on Dec. 23, 2009, the disclosures of which are incorporated by reference in their entirety.

FIELD OF THE INVENTION

The domain of the invention is that of pulsed lasers of which the pulse repetition frequency is variable, their energy being stabilized, and which are pumped by a continuous source.

BACKGROUND

Pulsed lasers currently exist, the pulses of which use intra-cavity switches, known as Q-switches, where Q represents the quality factor of the resonant cavity. They are known as Q-switched lasers.

There are two phases in a Q-switched laser. The pumping phase enables the storage of the pumping energy in the laser material. The closed cavity switch prevents resonance. The switch is opened to generate a pulse. Resonance is possible. The light present in the modes of the cavity is amplified by the laser material. An intense pulse is formed. The energy of this pulse is proportional to the energy stored in the laser material during pumping. The switching must be fast in order to ensure effective control of the energy and temporal profile of the pulse. Conventionally, only the very fast opening of the Q-switch is controlled. The controlled closure shortly after the opening may allow the energy per pulse to be reduced.

Each laser material transition has a lifetime. This is the time, excluding pumping, required for half of the population in an excited state of the laser transition to disappear. It is also the time required in order to attain half of the population in an excited state for a very long pumping duration in the absence of any parasitic effect that may reduce pumping efficiency.

If the period between the pulses is long compared with the lifetime of the excited state of the laser transition used, the energy per pulse is the maximum. Any increase in the period does not modify the energy per pulse. For a given laser, this energy per pulse is controlled by the power of the pumping and the lifetime of the excited state.

This is illustrated by FIG. 1 which shows two examples of gain curves as a function of time, for a lifetime of the excited state of 250 µs, this gain expressed in arbitrary units being accumulated in the amplifying medium of a Q-switched laser, by a continuous pumping A for the curve "a" and A/5 for the curve "b". For periods greater than 830 µs, the available gain varies by less than 10%; the energy per pulse varies in similar proportions.

At the other end of the curve, when the period is reduced, the energy per pulse is no longer controlled by the lifetime of the excited state. The laser operates at medium power. With a fixed period, the energy per pulse is proportional to the period separating each pulse. Any change in the period modifies the energy per pulse; the latter depends on the energy of the preceding pulse and the period separating them. In the examples shown in FIG. 1, this is the domain of periods less than 250 µs.

Finally, since the energy per pulse varies in proportions similar to the gain, for pulse periods varying between 150 and 1000 µs highly disparate energies per pulse are obtained, since they vary between 150 and 500 arbitrary units.

Moreover, the pulses must meet a minimum energy requirement for performance, but must not exceed a given energy threshold in order to avoid irreversible degradation of the laser.

A plurality of methods are used to obtain similar pulses with a variable repetition frequency.

The first solution carries out a sorting at the output of the Q-switched laser. The laser has a fixed repetition period referred to as the base period. The output pulses are either rejected or transmitted. The periods obtained are therefore limited to multiples of the base period; the starting position of each pulse train is imposed.

A different solution consists in modulating the continuous pumping source power as a function of the required time for the emission of each pulse. The modulation of the pumping power compensates for the effect of the increase in the energy of the pulse with the pumping duration; but this modulation is possible only insofar as the response time constant of the pumping source allows it, notably if the pumping source is a laser. It is not always possible to modulate the pump quickly enough, or it is not possible to predict sufficiently in advance when the following pulse will have to be emitted. The variable power of the pumping modifies the thermal equilibrium point of the resonant cavity when the repetition frequency changes, generating a thermal instability within the Q-switched laser.

A different solution involves the control of the time and duration of the opening of the Q-switch. The duration of opening depends on the energy of the preceding pulse and the elapsed time. The duration of opening is therefore controlled as a function of the time that has elapsed since the preceding pulse and of its energy. The opening and closing switch durations must also be controlled. A sophisticated electronic control system is necessary to open and close the Q-switch precisely. This double control is unusual and complex and its adjustment is difficult. For periods changing with each pulse, the control laws are difficult to adjust and readjustments are necessary during the life of the laser. Complexity reduces operating safety and reliability.

SUMMARY OF THE IMVENTION

The object of the invention is to obtain a pulse laser with continuous pumping, the emission of the pulses having a variable period and stable energy per pulse, as shown in FIG. 2.

The invention is based on the addition of an injector of which the emitted beam with the same wavelength as that of the laser is injected into the laser material in order to be amplified. The effect of this amplification which consumes gain is to simulate a reduction in the time constant of the laser material; the adjustment of the power of the injector modifies the apparent time constant of the laser material. The apparent time constant is that which is required in order to obtain a population half of that which would be obtained for a long pumping duration (typically in the order of 3 to 4 times greater than the time constant) and a constant injector power.

More precisely, the subject matter of the invention is a laser device suitable for emitting pulses with a variable period and with stabilized energy which includes:
   a resonant cavity including
      an amplifying medium presenting a stabilized gain G and suitable for emitting laser pulses at a wavelength λ, and
      a Q-switch,
   and a source of continuous pumping of the amplifying medium.

It is mainly characterized in that it furthermore includes an injector positioned outside the resonant cavity, suitable for emitting a beam of wavelength λ into the amplifying material for the duration of the pumping, and which includes means for adjusting the power of this beam in order to reduce the gain of the amplifying medium to G/k, where k is a real number greater than 1.7.

Thanks to the injector and with stable continuous pumping, each pulse can be temporally precisely controlled with a stabilized energy per pulse.

The thermal load of the pulsed laser is stable and independent from the pulse demands, since the pumping is continuous at a constant level.

The Q-switch has few constraints.

The injector preferably shares the same pumping means as the laser itself. The injector is thus active from the start of the pumping of the laser, providing the energy stabilization per pulse with no external controls.

According to one variant, the injector is disposed outside the pumping source-amplifying medium axis.

The injector may be a laser diode or a microchip laser or an electroluminescent diode.

BRIEF DESCRIPTION OF THE DRAWINGS

Other characteristics and advantages of the invention will become apparent from reading of the detailed description which follows, given by way of a non-limiting example, with reference to the attached drawings, in which.

The same elements are identified by the same references from one figure to another.

DETAILED DESCRIPTION

Figure 1:
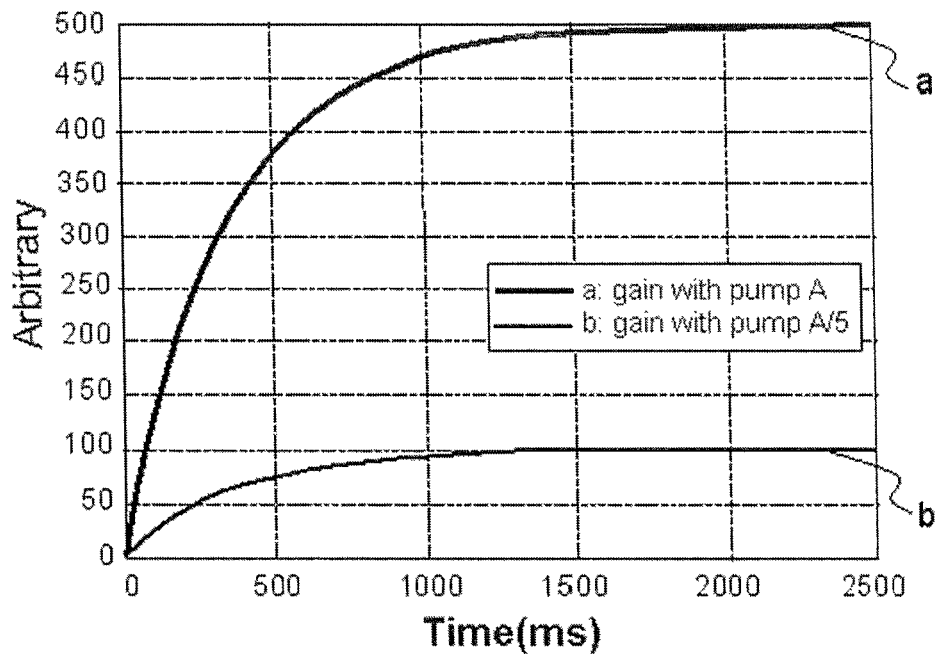
FIG. 1 shows schematically two examples of gain curves expressed in arbitrary units as a function of time, for a continuous pumping of power A for the curve "a" and A/5 for the curve "b"
Figure 2:
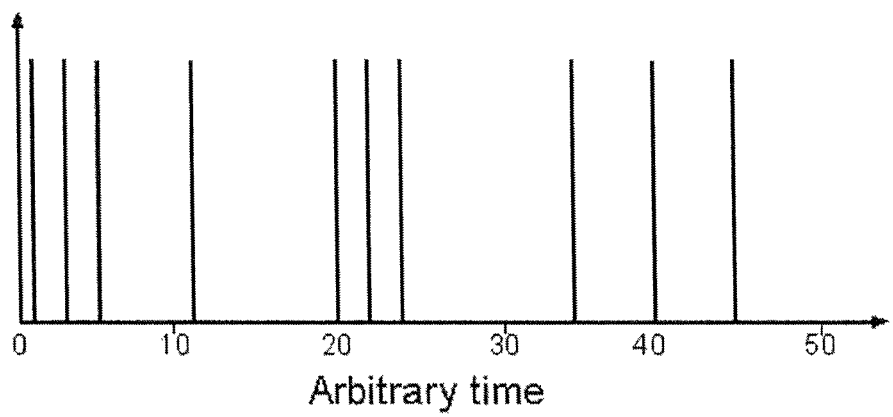
FIG. 2 shows schematically variable-period, energy-stable pulses.

The curves in FIG. 1 are explained in the following manner:

the power of the pumping is in competition with the fluorescence of the laser material (amplifying medium). The pumping increases the population of excited states of the laser material. The gain increases with the proportion of the population in an excited state. The fluorescence is proportional to the gain. The fluorescence is an incoherent emission at the same wavelength as the laser. The fluorescence consumes the gain. At the start of the pumping, there is no significant number of excited states, there is no gain, there is no fluorescence. The gain increases with the pumping. While it remains low, the fluorescence consumes little gain. With the increase in the gain, the fluorescence limits this increase. Finally, the gain provided by the pumping is entirely consumed by the fluorescence. The gain level is maximum. This level is a function of the pumping power.

N.B.: for high pumping powers, the fluorescence is not the first characteristic limiting the gain. This process of increasing the gain can also be limited by the total quantity of excited states that can be created in the laser material.

the time constant is defined without pumping, it is the duration required for half of the excited states to disappear through fluorescence. It is an intrinsic characteristic of the laser material, well within the time constant, the energy per pulse is proportional to the pumping duration, well beyond the time constant, the energy per pulse is fixed, the energy per pulse is proportional to the pumping power (the curve "a" is "homothetic" of the curve "b").

The effect of the method according to the invention is to reduce the equivalent time constant of the laser material. This is obtained by injecting into the laser material a beam of the same wavelength λ as that of the beam emitted by the laser material. In this material, the beam emitted by the injector will be amplified in proportion to the amount of the gain. Since the pumping is continuous, there is competition between the gain provided by the pumping and the consumption of this gain by the amplification of the injection. This injection will limit the gain G available in the cavity beyond a certain level. For a given pumping level, this is equivalent to a reduction in the lifetime of the excited state of the laser material. The equivalent lifetime is adjusted by the power level of the injection. The amplified injection must be rejected by the Q-switch to avoid the beginning of the construction of a pulse. The beam is emitted by the injector when the Q-switch is in the closed position. The role of the injector is effective for the duration of the pumping; it can be emitted or not when the Q-switch is in the open position.

The energy stored in the laser material is limited by this gain consumption of the injector. This limitation of the gain prevents any creation of pulses with excessive energy, independently of the elapsed period before the pulse.

This injected beam is amplified by the laser medium of which the gain and therefore the energy are then limited. This injector thus provides a static protection against pulses with excessive energy.

An injector is normally used to increase the emission quality of the laser: purity and spectral position, transverse mode quality or temporal pulse precision. To do this, the injector emits in the emission mode and direction of the laser. A very low power of the injector in the laser is sufficient. The beam emitted by the injector must be in resonance in the laser cavity. The injector emits when the switch is open to facilitate the required emission. An injector can also be used in a continuous laser. The use according to the invention therefore differs from normal uses.

Figure 3:
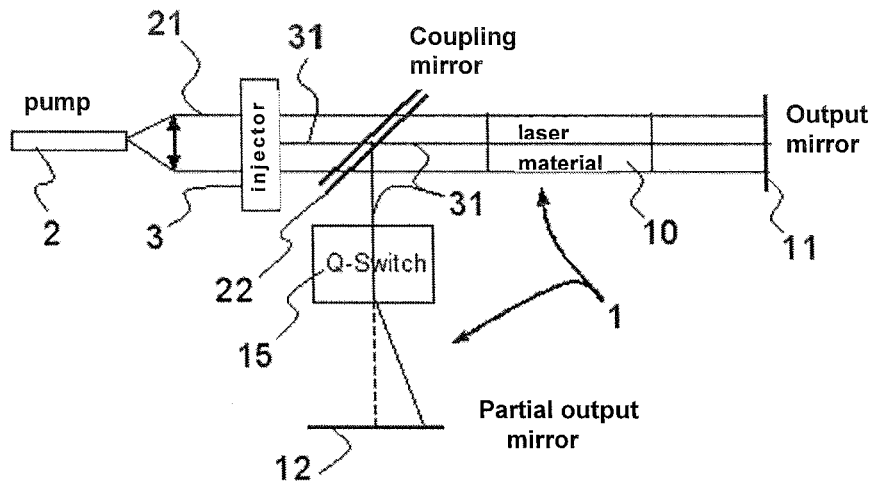
FIG. 3 shows schematically an example of a pulsed laser device according to the invention.

FIG. 3 shows an example of a Q-switched laser according to the invention. It includes a resonant cavity 1 which comprises a first output mirror 11 and a second mirror 12; it is shown as bent in an L-shape, but could also be linear or annular.

It includes a laser material 10 suitable for emitting a beam of wavelength λ; an example of such a material is Nd:YAG where λ=1.064 μm or Ho:YAG where λ=2.1 μm.

The cavity 1 also includes a controlled Q-switch 15 enabling the emission of pulses on demand. This Q-switch may, for example, be an acousto-optical switch which diverts the beam from a resonant (or tuned) cavity path towards a non-resonant (or detuned) cavity path where the second mirror 12 then acts as a partial output mirror, as shown in the figure, and vice versa. When the cavity is detuned, the pumping power is stored in the laser material. When the cavity is tuned, a pulse can be formed if the gain is sufficient. An electro-optical switch, causing the polarization to turn on demand, can also be used in an architecture selecting the polarization of the light; a polarizer is then added in the resonant cavity.

The cavity 1 is coupled to a continuous pumping source 2, for example by a coupling mirror 22, transparent for the wavelength of the pumping source and reflecting for the beam emitted by the laser material 10, but which remains weakly transparent at the wavelength of the laser.

An emitter 3 of a beam 31 of the same wavelength λ is coupled with the laser material 10 in such a way as to inject said beam into this material. This emitter 3 may more generally be any continuously emitting light source of which the emission spectrum covers the spectral emission band in which the Q-switched laser must emit. The beam 31 is in continuous emission for the entire duration of the pumping of the laser. This emitter is also referred to as an injector. It is located outside the resonant cavity 1, so as not to be disturbed by the pulses emitted by the resonant cavity 1.

This injector 3 is, for example, passive; it is then located on the path of the pumping beam 21 in order to be controlled by this pumping beam. The injector thus uses a fraction of the pumping beam 21. This then involves a passive protection. The assembly is static without active control to provide protection. The emission of the injector is not necessarily in a resonant mode of the laser cavity.

It may be located on the path of the pumping beam 21 in front of the resonant cavity 1 as shown in the figure: the injection is effected via the same path as that of the pumping beam. According to one variant, the pumping beam is divided into two, one part being directly steered towards the laser material 10, the other being steered towards the injector 3 located outside the pump-material path.

In the case of a passive injector, the power of the emitted beam is fixed in the design.

According to a different operating mode, the injector 3 is active and includes its own control means. It can be positioned in any location that allows a distributed illumination of the laser material, to have a homogeneous effect, notably outside the pumping beam 21.

The power of the beam 31 emitted by the injector is adjusted taking into account the transmission of the coupling mirror, in such a way as to reduce the gain G of the laser material by a factor k, where k is a real number greater than 1.7.

This injector may be an electroluminescent diode, or may itself be a laser such as a laser diode or a microchip laser composed of the same material as the laser itself, of which the parallel surfaces are reflecting on one side and partially reflecting on the side of the output at the wavelength of the laser. It is not necessary for the emitted wavelength to be resonant in the cavity of the laser.

In the case, for example, of an electroluminescent diode or laser diode, the means for controlling and the means for adjusting the power of the emitted beam are the electrical current.

In addition to the advantages already mentioned, it can also be noted that, since the period of the pulses and the energy of the preceding pulse no longer need to be taken into account, the control of the Q-switch is simple.

Furthermore, thermal stability is retained even in the absence of emission of pulses, since the continuous pumping can be maintained without risk.

Figure 4:
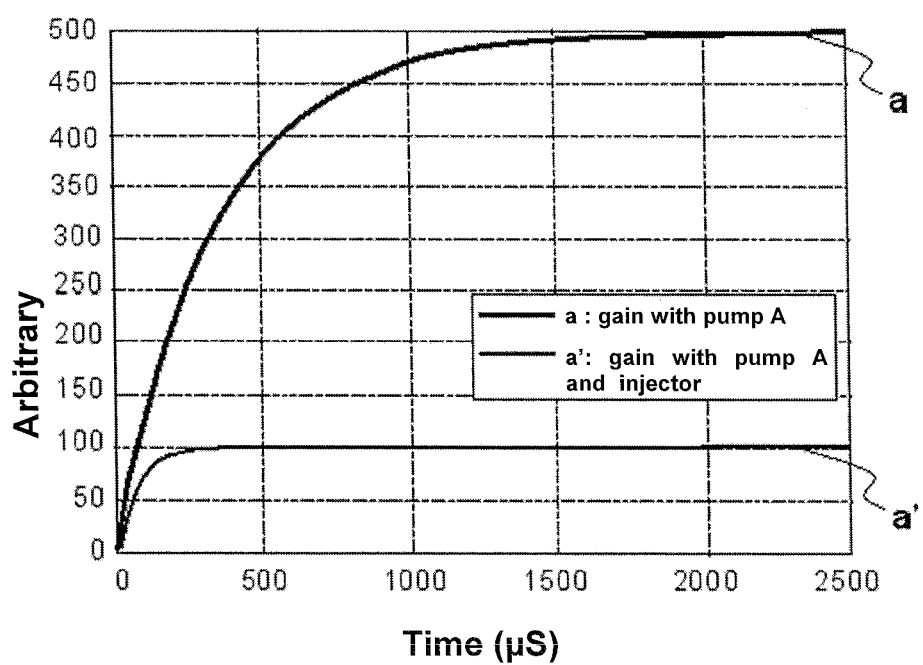
FIG. 4 shows schematically the gain curves obtained with a laser device according to the invention under conditions equivalent to those of example 1 in FIG. 1.

FIG. 4 shows two examples of gain curves obtained with a continuous pumping A, the one "a" with a Q-switched laser as described in FIG. 1 with a stabilized gain G, the other "a" with a Q-switched laser provided with an injector according to the invention adjusted to a power level allowing a stabilized gain level of G/5 (k=5).

Since the energy per pulse varies in proportions similar to the gain, the energy per pulse is stable at better than 10% (from 90 to 100 arbitrary units) for any period greater than 150 μs. Whereas, without the injector, the energy per pulse would vary by 300% (from 170 to 500).

Emissions of pulses with a variable period and controlled energy per pulse have thus been obtained.

The invention claimed is:

1. A method for using a laser device suitable for emitting variable-period pulses, comprising:
   providing a resonant cavity including an amplifying medium presenting a stabilized gain G and suitable for emitting laser pulses at a wavelength λ, and a Q-switch;
   pumping the amplifying medium using a source of continuous pumping;
   positioning an injector positioned outside the resonant cavity, the injector suitable for emitting a beam of wavelength λ into the amplifying medium;
   providing a means for adjusting the power of the injected beam by a step of emission by the injector of a beam for the duration of the pumping when the Q-switch is in a closed position, and in that the power of the injected beam is adjusted to reduce the gain G of the amplifying medium to G/k, where k is a real number greater than 1.7; and
   emitting the variable period pulses from the laser device.

2. The method for using a laser device as claimed in claim 1, wherein the injector is controlled by the pumping source.

3. A laser device configured to emit variable-period pulses, comprising:
   a resonant cavity including an amplifying medium presenting a stabilized gain G and suitable for emitting laser pulses at a wavelength λ, and a Q-switch;
   a source of continuous pumping of the amplifying medium;
   an injector positioned outside the resonant cavity, suitable for emitting a beam of wavelength λ into the amplifying medium; and
   means for adjusting the power of the injected beam, when the Q-switch is in a closed position, configured to reduce the gain G of the amplifying medium to G/k, where k is a real number greater than 1.7.

4. The laser device as claimed in claim 3, wherein the injector is disposed outside the resonant cavity between the pumping source and the amplifying medium.

5. The laser device as claimed in claim 3, wherein the injector is a laser diode or a microchip laser or an electroluminescent diode.

* * * * *